United States Patent
Lloyd

(10) Patent No.: US 7,444,147 B2
(45) Date of Patent: Oct. 28, 2008

(54) TELECOMMUNICATIONS SYSTEM

(75) Inventor: Rich Lloyd, Surbiton (GB)

(73) Assignee: Nokia Corporation, Espoo (FI)

(*) Notice: Subject to any disclaimer, the term of this patent is extended or adjusted under 35 U.S.C. 154(b) by 531 days.

(21) Appl. No.: 11/025,843

(22) Filed: Dec. 30, 2004

(65) Prior Publication Data

US 2005/0181824 A1      Aug. 18, 2005

(30) Foreign Application Priority Data

Dec. 30, 2003   (GB)   ................... 0330191.8

(51) Int. Cl.
*H04Q 7/20* (2006.01)

(52) U.S. Cl. ............ 455/434; 455/518; 455/41.2; 455/422.1; 455/435.1

(58) Field of Classification Search .......... 455/518, 455/41.2, 422.1, 435.1, 434
See application file for complete search history.

(56) References Cited

U.S. PATENT DOCUMENTS

| 6,658,264 | B1* | 12/2003 | Irvin ...................... 455/552.1 |
| 2001/0012757 | A1 | 8/2001 | Boyle |
| 2002/0146981 | A1 | 10/2002 | Saint-Hilaire et al. |
| 2003/0069989 | A1 | 4/2003 | Silvester |
| 2003/0119540 | A1* | 6/2003 | Mathis .................... 455/518 |
| 2004/0198354 | A1* | 10/2004 | Pettine, Jr. ............. 455/435.1 |
| 2004/0203381 | A1* | 10/2004 | Cahn et al. ............. 455/41.2 |
| 2005/0090242 | A1* | 4/2005 | Kotzin et al. ........... 455/422.1 |

* cited by examiner

*Primary Examiner*—Duc Nguyen
*Assistant Examiner*—Wayne Cai
(74) *Attorney, Agent, or Firm*—Squire, Sanders & Dempsey, L.L.P.

(57) ABSTRACT

A communication terminal, comprising: first transceiver means for transmitting to and receiving from at least one communication terminal directly; second transceiver means for transmitting to and receiving from at least one communication terminal via a communications network; and selecting means for selecting the transceiver means in order to communicate with the at least one communication terminal.

26 Claims, 4 Drawing Sheets

TELECOMMUNICATIONS SYSTEM

FIELD OF THE INVENTION

The present invention relates to a telecommunications system, in particular but not exclusively a telecommunications system in a cellular wireless system.

BACKGROUND OF THE INVENTION

Wireless cellular communication networks and their operation are generally well known. In such a system the area covered by the network is divided into cells. Each cell is provided with a base station, which is arranged to communicate with a plurality of mobile stations or other user equipment in a cell associated with the base station.

In the last few years the processing capability of user equipment has allowed network multiplayer (i.e. two or more players) games to be stored and played on user equipment.

There is also demand for other user equipment network applications. An example of such network applications include group messaging, where users in a group of users using user equipment can transmit text and images to one or more users in the group. A further example of such a network application is for conference calling between selected groups of users using user equipment.

In the attempt to reduce fixed or "wired" connections between user equipment and other ancillary equipment, for example a mobile phone and a hands-free headset, a series of short range, low power, wireless communication system have been developed and typically embedded within user equipment.

One of the best known examples of such wireless communication systems is the one known as Bluetooth.

Bluetooth uses a low power radio frequency signal, typically in the order of mW transmitted power, to communicate between two entities. It has a range of up to 100 m and is capable of transmitting data rates of approximately 1 Mbit per second with an omni-directional transmission pattern. The latest specification of which is version 1.2 which can be found on the Bluetooth web site.

Another low power short range wireless communication protocol is that known as IrDA or Infrared Data Association. The IrDA protocol uses an infrared transceiver to communicate between entities. The IrDA specification documents are available on the IrDA web site.

IrDA differs from Bluetooth in many aspects such as in terms of range, data capacity and architecture. One important difference between the two is that IrDA is a line of sight wireless communication system. In other words both transmitting user equipment and receiver user equipment must be able to see each other in order to communicate. Bluetooth being a radio frequency system can pass through barriers and does not necessarily rely on line of sight.

To date the network games and network applications that are currently available for use on user equipment in a cellular telecommunication system have been applications which are accessible either purely over the cellular telecommunications network or purely over a short distance using the short range communication link, such as a cable data link or a wireless communication link such as Bluetooth.

Network applications developed for use over the cellular network are typically costly for the user as they require the same number of cellular network links as the number of users attached to the application. Furthermore due to the relatively slow data links used over the cellular network only low bandwidth applications can be supported. The one advantage of such systems however is that provided the user can be located by the cellular network there is no limit on the range of operation of the network application.

Network applications developed for use over the short range wireless communications systems are effectively cost free for the users and have a relatively large bandwidth over which to communicate. However the short range nature of the communication system limits the network application range of operation.

There is therefore a problem of operating and setting up a network application which has no effective limit of range, unlike the purely short range systems, and is cheaper for the user and capable of transmitting at a faster rate and with shorter delays than the pure cellular network applications.

SUMMARY OF THE INVENTION

It is an aim of the embodiments of the present invention to address or partially mitigate the problems discussed previously.

There is provided according to the present invention a communication terminal, comprising: first transceiver means for transmitting to and receiving from at least one communication terminal directly; second transceiver means for transmitting to and receiving from at least one communication terminal via a communications network; and selecting means for selecting said transceiver means in order to communicate with said at least one communication terminal.

The communications terminal may further comprise scanning means for determining whether at least one of said communication terminals are contactable via said first transceiver means.

The selecting means may be arranged to select said first or second transceiver means in dependence on said scanning means determining whether at least one of said communication terminals is contactable via said first transceiver means.

The communications terminal may further comprise a memory, said memory may comprise a list identifying at least one communication terminal, and wherein said scanning means is arranged to determine whether at least one of said communications terminals in said memory is contactable via said first transceiver means.

The list may comprise at least one of; telephone numbers; user identifiers; user nicknames.

The list may further comprise detection information, said detection information identifying whether said at least one communication terminal identified in said list is contactable.

The list may further comprise acceptance information, said acceptance information identifying whether said communication terminal identified in said list has accepted an invite to communicate.

The list may further comprise network information, said network information identifying whether said communication terminal identified in said list is contactable by said first or said second transceiver and from which other communication terminal said communication terminal is contactable from.

The selection means may further comprise copying and updating means for passing copies of said list to each of said communication terminal on the list.

The communication terminal may be one of: a personal communications device; a personal digital assistant; a personal computer.

The first transceiver means may comprise first wireless transceiver means.

The first wireless means may be one of: a Bluetooth transceiver; a IrDA transceiver; a 802.11 transceiver.

The second transceiver means may comprise wireless cellular transceiver means.

The wireless cellular transceiver means may be one of: a GPS transceiver; a UMTS transceiver; a WCDMA transceiver; a CDMA 2000 transceiver.

The area of coverage of said first transceiver means may be less than the area of coverage of said second transceiver means.

The selection means may be arranged to select said first transceiver means if said at least one communication terminal is contactable by said first transceiver means.

According to a second aspect of the present invention there is provided a method for operating a communications terminal comprising the step of: selecting either a first transceiver for communicating directly to at least one communications terminal, or a second transceiver for communicating to at least one communications terminal via a communications network.

The method may further comprise the step prior to selecting of: detecting whether at least one of said communication terminals are contactable via said first transceiver means.

The step of selecting may comprise the step of: selecting either said first or second transceiver in dependence on the result of said detecting step.

The method may comprise the step of; identifying said at least one communications terminal from a list stored in a memory.

The step of identifying may comprise at least one of the steps of; identifying said at least one communications terminal by a telephone number stored in said memory; identifying said at least one communications terminal by a user identifier stored in said memory; and identifying said at least one communications terminal by a user nickname stored in said memory.

The step of identifying may further comprise the step of: storing detection information, said detection information identifying whether said at least one communication terminal identified in said list is contactable.

The step of identifying may further comprise the step of: storing acceptance information, said acceptance information identifying whether said communication terminal identified in said list has accepted an invite to communicate.

The step of identifying may further comprise the step of: storing network information, said network information identifying whether said communication terminal identified in said list is to be contacted by said first or said second transceiver and from which other identified communication terminal said communication terminal is contactable from.

The step of identifying may further comprise the step of: copying said list to each of said identified communication terminals.

The communication terminal may be one of: a personal communications device; a personal digital assistant; a personal computer.

The first transceiver may be one of: a Bluetooth transceiver; a IrDA transceiver; a 802.11 transceiver.

The second transceiver may be a wireless cellular transceiver being one of: a GPS transceiver; a UMTS transceiver; a WCDMA transceiver; a CDMA 2000 transceiver.

The area of coverage of said first transceiver may be less than the area of coverage of said second transceiver.

The step of selecting may further comprise the step of: selecting said first transceiver means if said at least one communication terminal is contactable by said first transceiver means.

The method may further comprise the steps of: detecting whether at least one further communications terminal is contactable using first transceiver means from said at least one detected communications terminal; selecting said first transceiver means of said at least one detected communications terminal if said at least one further communications terminal is contactable by said first transceiver means from said detected communications terminal.

The method may further comprise the steps of: determining if said at least one communications terminal is able to communicate using said first transceiver means with at least one other communications terminal for which said second transceiver means have been selected; and selecting said first transceiver means for communicating directly to at least one other communications terminal if said at least one other communications terminal is contactable from said at least one communications terminal via said first transceiver means.

The method may further comprise the steps of: determining if said at least one communications terminal is able to communicate using said first transceiver means with at least one other communications terminal for which said first transceiver means have been selected; and selecting said second transceiver means for communicating to said at least one other communications terminal via a communications network if said at least one other communications terminal is not contactable from said at least one communications terminal via said first transceiver means.

BRIEF DESCRIPTION OF DRAWINGS

For a better understanding of the present invention and how the same may be carried into effect, reference will now be made by way of example only to the accompanying drawings in which.

DETAILED DESCRIPTION OF EMBODIMENTS

Figure 1:
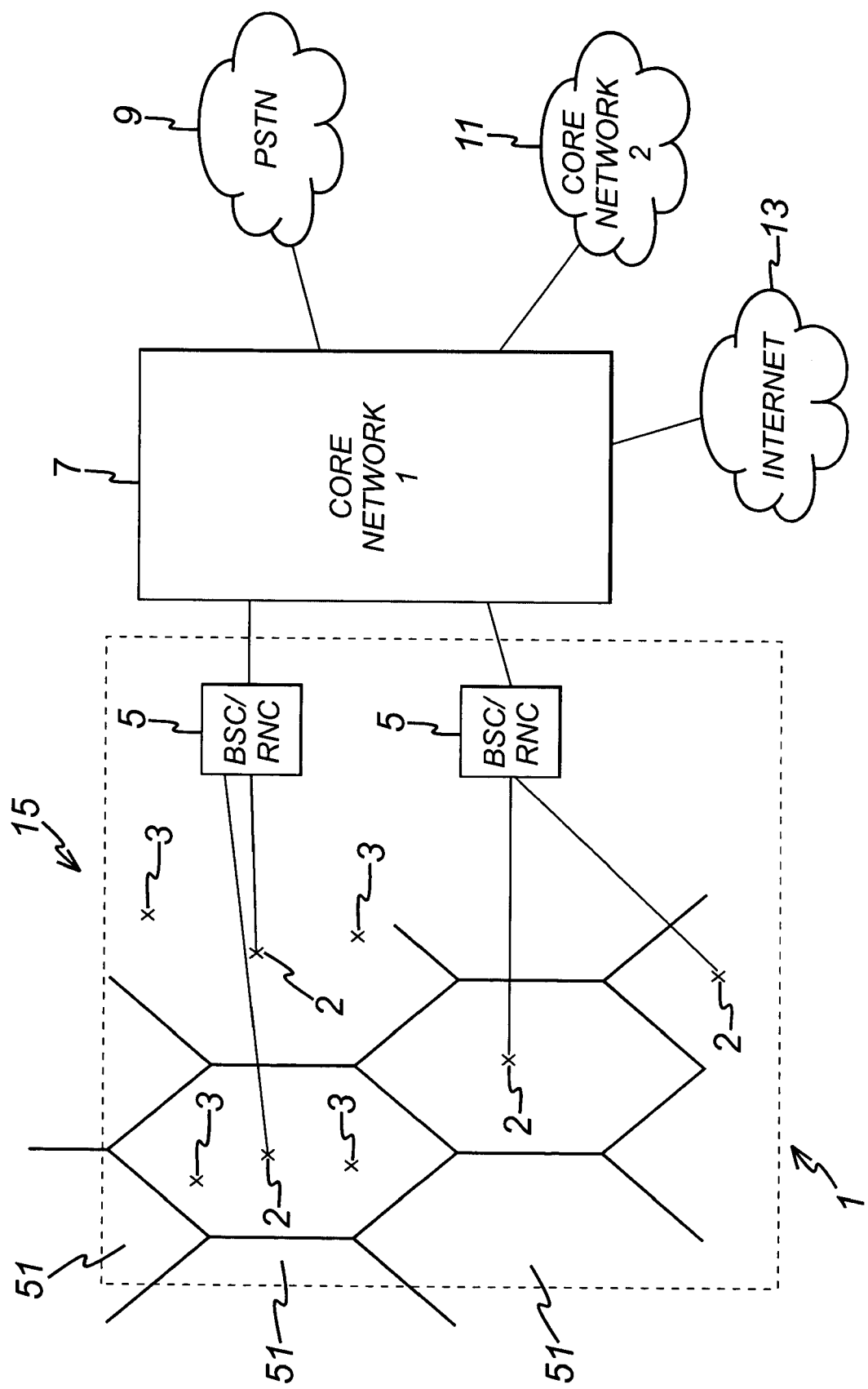
FIG. 1 shows a schematic view of a typical cell layout of a cellular network, in which embodiments of the present invention can be implemented.

Reference is made to FIG. 1, which shows part of a cellular telecommunications network 1 in which embodiments of the present invention can be implemented. The area covered by the network is divided into a plurality of cells 51. Further cells bordering these cells are not shown for clarity. Each cell has associated therewith a base transceiver station 2 also known as a base station. The base transceiver station 2 is arranged to communicate with mobile devices or other user equipment 3 associated with the base transceiver station 2. Examples of user equipment 3 include mobile telephones, personal digital assistants (PDA) with transceiver capabilities, and laptops with transceiver capabilities. These user equipment devices 3 are also known as mobile stations.

The cells may overlap at least partially or totally. In some systems these cells 51 may have a different shape to that illustrated. In some embodiments the base transceiver stations 2 may communicate with user equipment 3 outside their associated cell. In other embodiments user equipment 3 may communicate with user equipment 3 directly and without recourse to the base transceiver station 2. In other embodiments of the invention, base transceiver stations 2 may communicate with another base transceiver stations 2 directly.

The base transceiver stations 2 from the cells 51 are in turn typically connected to a base station controller (BSC) or radio network controller (RNC) 5. These controllers are then connected to the core network 7. The core network is then capable of routing communication from the user equipment 3 received via the base transceiver stations 2, and the base station controller 5. The core network 7 shown in FIG. 1 is shown connected to the public switched telephone network (PSTN) 9, a second core network 11, and the computer network known as the Internet 13.

Figure 2:
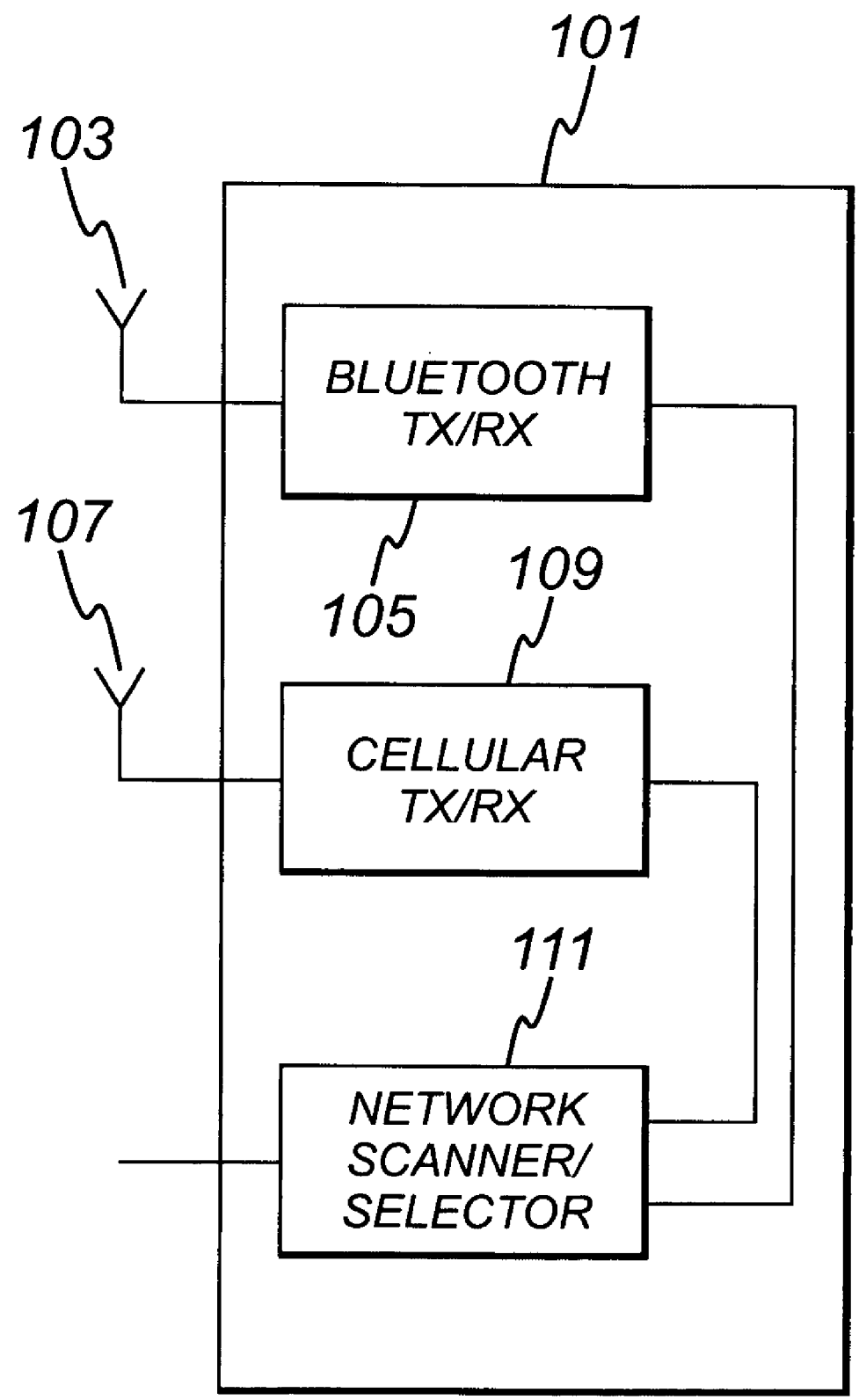
FIG. 2 shows a schematic view of user equipment, in which embodiments of the present invention can be implemented.

With reference to FIG. 2 user equipment, such as for example used within cellular network described above and within which embodiments of the present invention can be used is shown. The user equipment 101 comprises a first antenna 103, a second antenna 107, a Bluetooth transceiver 105, a cellular network transceiver 109, and a network scanner/selector 111.

The first antenna 103 is connected to the Bluetooth transceiver 105. The Bluetooth transceiver 105 is connected to the network scanner/selector 111. The second antenna 107 is connected to the cellular transceiver 109. The cellular transceiver 109 is connected to the network scanner/selector 111.

The first antenna 107 and the cellular network transceiver 109 are configured in order to communicate with a base station known in the art.

The second antenna 103 and the Bluetooth transceiver 105 are arranged to communicate with other Bluetooth compatible devices.

The network scanner/selector is arranged to control and monitor the Bluetooth transceiver and the cellular transceiver and is capable of requesting the Bluetooth transceiver to transmit a message requesting any Bluetooth compatible devices with a specific address or series of addresses to respond thus performing a scanning of the Bluetooth environment about the user equipment 101. In practice the scanning of the bluetooth environment is carried out by the bluetooth transceiver receiving the addresses or identifiers of other bluetooth transceivers within range and detecting those with specific addresses among the received addresses.

The network scanner/selector is further capable of communicating via the cellular transceiver 109 with the cellular network to determine if a specific device is contactable via the cellular network The network scanner/selector 111 in some embodiments of the present invention comprises memory arranged to store a list of identification values. The identification values are able to identify either individual user equipment or groups of user equipments.

In some embodiments of the present invention the network scanner/selector 111 is capable of reading these identification values from a memory elsewhere in the user equipment or input by the user.

In some embodiments of the invention the two antennas may be housed within the same physical volume or a single antenna used to perform the same role as the two antennas described.

The user equipment 101 further comprises components as known by the skilled person required in order that the user equipment is able to carry out its designated tasks as user equipment. These additional elements, unrelated directly to the embodiments of the present invention have been omitted in order to simplify the description in terms of the embodiments of the invention.

Figure 3:
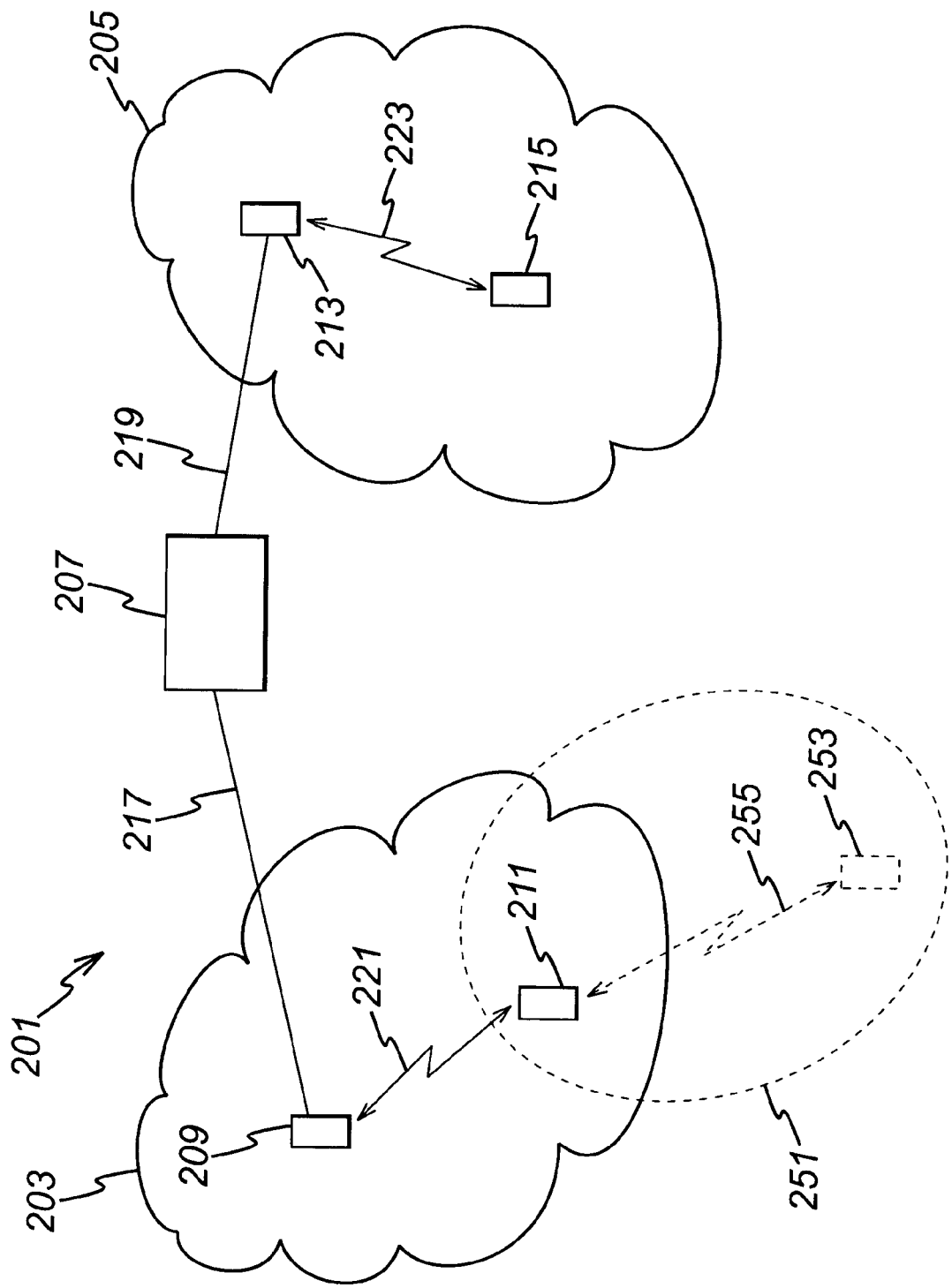
FIG. 3 shows a schematic view of an example of the user equipment units shown in FIG. 2 and how they can be configured according to an embodiment of the present invention.

FIG. 3 shows a part of the telecommunications network as shown in FIG. 1 in embodiments of the present invention are illustrated. The telecommunications network 201 shows a first local region 203, a second local region 205, and a cellular communications network 207.

The first local region 203 comprises a first user equipment 209, and a second user equipment 211. The first user equipment is connected to the second user equipment 211 via a first Bluetooth communications link 221. The first user equipment 209 is further connected to the cellular communications network 207 via a cellular wireless link 217.

The second local region 205 comprises a third user equipment 213 and a fourth user equipment 215. The third user equipment 213 is connected to the fourth user equipment 215 via a second Bluetooth communications link 223. The third user equipment is further connected to the cellular telecommunications network 207 via a cellular communications link 219.

Figure 4:
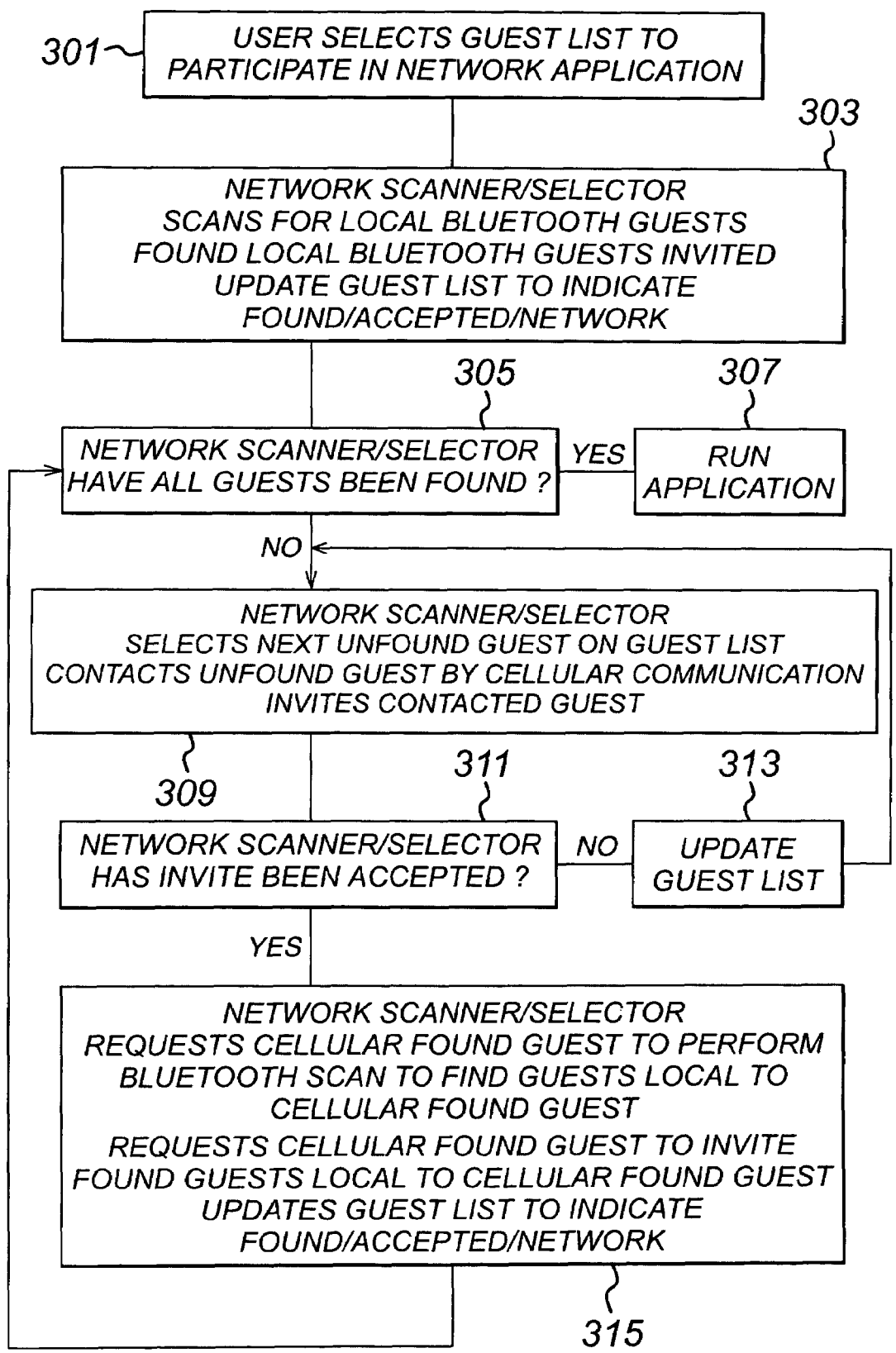
FIG. 4 shows a flow diagram view of the method used in an embodiment of the present invention.

With reference to FIG. 4 in combination with FIGS. 3 and 2 the method used in the first embodiment of the present invention is further described.

In the first step 301 of the method the user selects a guest list containing a list of identification values which can be used to contact other user equipment. This list can also be defined as a list of candidates with which the user wishes to communicate.

In a first embodiment of the present invention this list may be a buddy list containing details such as nicknames and/or phone numbers of friends of the user. In other embodiments of the present invention these identification values can be unique bluetooth addresses set by the manufacturer or bluetooth identifiers such as nicknames set by the users of other user equipment to identify their user equipment.

In other embodiments of the present invention this list may be selected from the users user equipment address book. In other embodiments the list may be selected from a list of user equipment having subscribed to a directory list. In further embodiments the list may be selected from a list of user equipment stored in a directory as being capable of operating a specific network application. These lists in some embodiments of the present invention contain the Bluetooth address of the candidate. The list may be one or more groups of users.

In the next step the user equipment network scanner/selector 111 of the user receives the guest list and proceeds to scan for local candidates or candidates using the Bluetooth low power wireless communications link. As described earlier this scanning is the result of receiving bluetooth addresses or identifiers transmitted by other bluetooth transceivers within range of the user equipment and comparing the received guest list with the received addresses or identifiers.

With reference to FIG. 3 if the user is that operating the first user equipment 209 within the first local region 203 and the guest list includes the candidates using the second user equipment 211, the third user equipment 213 and the fourth user equipment 215, then the only candidate within local Bluetooth range as indicated by the coverage of the first local region 203 is the second user equipment 211.

The network scanner/selector further in step 303 invites any local candidates that have been found using the Bluetooth scan to participate in the network application.

In the example stated previously the first user equipment 209 network scanner/selector invites the second user equipment over the first Bluetooth link 221 to participate. If for the purpose of the example the second user equipment 211 accepts the invite an acceptance message is passed back to the first user equipment 209 also via the Bluetooth communications link 221.

In the final part of the second step 303 the network scanner/selector 111 then updates the selected list. The list or memory associated with the candidates on the guest list is updated to indicate whether the candidate has been detected or found. In other embodiments of the present invention the selected guest list or associated memory can be updated to contain information on whether the candidate has accepted the invite. In further embodiments the guest list or associated memory can be updated to indicate on which network or communications link the candidate on the list is contactable. In some embodiments other details relating to the location of the user equipment and bandwidth of the connection between the two user equipment elements can also be stored. In some embodiments of the present invention more than one of the above updated values are stored.

In the current example shown in FIG. 3 the network scanner/selector for the first user equipment 209 updates the guest list to indicate that the second user equipment 211 has been found, has accepted the invite and is available on the Bluetooth network from the user equipment 209.

In the next step 305 the network scanner/selector 111 determines if all the candidates on the guest list have been found. If all the candidates have been found then the network candidate finding process halts and the method passes to step 307.

In step 307 the application is run. The guest list stored within the network scanner/selector 11 is capable of indicating which of the candidates have accepted and also how to communicate to each of the accepted candidates. The data passed to each of the members that have accepted on the guest list is dependent on the application. In some applications supported by the embodiments of the invention, the application is hosted by a sole user equipment terminal. The sole user equipment terminal transmits and receives networking data acting as the control network node. With such an application the hosting user equipment terminal has all of the information required. In other words the controlling user equipment has information to which candidate user terminal is contactable via which system, with the candidate user equipment terminals having the information on how to contact the hosting user equipment terminal.

In other applications supported by embodiments of the invention, the application hosting is handled by several or all of the networked user equipment terminals. The networked terminals communicate with each other to maintain a consistent application. Such applications require each of the handling user equipment terminals to store information containing the network details of all other user terminals. The non-handling user equipment terminals contain the network details of at least one of the handling terminals.

If all of the candidates have not been found the method proceeds to step 309. In step 309 the user equipment network scanner/selector 311 selects the next unfound candidate on the guest list. The user equipment network scanner/selector 311 using the cellular transceiver 109 attempts to contact the next unfound candidate via the cellular telecommunications network. If the candidate is found using the cellular telecommunications network, the user equipment network scanner/selector 111 invites the contacted candidate.

In the example as shown in FIG. 3 the network scanner/selector at the end of step 305 has only found the second user equipment 211 using the local Bluetooth communications system. Therefore the network scanner/selector of the first user equipment 209 in step 309 selects the next unfound candidate on the guest list, the third user equipment 213. The first user equipment 209 then attempts to contact the third user equipment 213 (located in the second local region 205) via the cellular telecommunications system 207 and the wireless cellular links 217 and 219. Having contacted the third user equipment 217 the first user equipment 209 invites the second user equipment 213 to participate in the network application.

In the next step 311 the network scanner/selector 111 determines whether or not the invite has been accepted from the candidate contacted in step 309 using the cellular network. If the invite is rejected then the method passes to step 313. In this step the network scanner/selector 111 updates the guest list to indicate that the candidate has been found but has rejected the invite. The method then passes back to step 309 whereby the user equipment network scanner/selector 111 selects the next unfound candidate.

If the invite is accepted the method passes to step 315. Step 315 is optional and may be omitted. If omitted the next step would be step 305. In step 315 the accepted user equipment network scanner/selector 111 performs a scan to attempt to find candidates local to the cellular found candidate. In some embodiments of the present invention the scan is carried out using the Bluetooth communications system. In some embodiments the scan is carried out after receiving a request from the user equipment terminal that transmitted the original invite after receiving the acceptance receipt from the candidate.

This scan in some embodiments of the invention can be triggered in the candidate network scanner/selector before an acceptance receipt is passed back and as part of the acceptance step carried out by candidate.

Furthermore the accepted candidate network scanner/selector invites any other candidates found local to the candidate to participate in the network application using the same Bluetooth communication system used to perform the scan.

The results of the accepted candidate scan and any consequent invite receipts are then passed back to the user equipment terminal network scanner/selector 111 in order that the network scanner/selector 111 can update its guest list to indicate which candidates have been found or accepted or on which communications network the candidates are found.

After each update the method passes back to step 305 to check whether all of the invited candidates have been invited. If they have the application is run as described above, if not the next unfound candidate is attempted via the cellular network as also described above.

In the example shown in FIG. 3 the third user equipment 213 accepts the invite from the fist user equipment 209 to participate in the network application. The third user equipment performs a Bluetooth scan to find further candidates local to the third user equipment 213. The fourth user equipment 215 is local to the third user equipment 213 as indicated by the second region 205. The third user equipment 213 would therefore invite the fourth user equipment 215 to participate in the network application using the Bluetooth communications link 223.

For this example the fourth user equipment 215 accepts the invite and transmits an acceptance message to the third user equipment 213 using the Bluetooth communications link 223. This information can be further transmitted back to the first user equipment 209 via the cellular telecommunications system 207 and communication links 217 and 219.

The first user equipment 209 therefore updates its guest list to indicate which candidates have been found or accepted invites or which network the candidates can be found on. In this example therefore all of the candidates on the guest list have been found and therefore the application can start using the communication links set up during the method as described in the present invention.

In one embodiment of the present invention the network application is a game such as a network multiplayer game. Such a game would be required to be capable of supporting a specific application program interface (API). For an example a user equipment terminal without Bluetooth support or one with Bluetooth support but without the Bluetooth application program interface would not be able to play a game requiring a Bluetooth communication link.

In a further embodiment of the invention the network application could be for instance a network application where text, pictures, voice or a combination of any of the three are communicated via the network of user equipment terminals as set up in the method of the invention. This type of application can be considered to be similar to that of a private chat room on the internet as is known in the art, or a multimedia conference call but without the need to use a cellular link for each of the candidates.

Furthermore in an additional embodiment of the present invention an IrDA communications link is used instead of or additionally to the Bluetooth communication system to detect and communicate with the local user equipment. Other wireless or wired communications systems as known in the art to the skilled man can also be used to supplement or replace the Bluetooth communications system as described previously.

In an additional embodiment of the present invention, network communications between the user equipments are monitored to determine if the connections between the invited candidates is still optimal. In such an embodiment if a candidate user equipment terminal connected via the short range communications system becomes unreachable then the host network scanner/selector attempts to contact the candidate user equipment via another short range communications system or via a cellular communications link. Such equipment can become unreachable either by moving out of range of the wireless communications link, by moving into a reception shadow or out of line of sight of the other party.

Similarly the network scanner/selector 111 can in some embodiments perform a refresh of the communications links between the user equipment whilst the application is running in order to determine whether any of the user equipment is within non-cellular telecommunication range of each other. If so the network scanner/selector switches the network connection from a cellular communications link to a Bluetooth or other communications link within range of operation.

With reference to an additional embodiment of the present invention the handling of the guest list and thus the network communications list can be distributed among the accepted user equipment. In such a system a copy of the guest list is passed to all user equipment that has accepted the original invite.

In further embodiments of the invention iterative scanning of user equipment terminals can occur. In such an embodiment once the user equipment has accepted the invite, it automatically performs a scan to determine if there are any candidates on the guest list within range of the Bluetooth communications link (or other non-cellular communications system link). If any candidates are found and these other candidates accept the invite these additional candidates further scan using their Bluetooth (or other) communications link. This continues until no additional candidates are found. The results of these scans are then passed back down the chain and the guest list and/or associated memory is updated to contain all of the found candidates information.

In such an embodiment user terminals can connect to form a series of partially overlapping communication pico-nets connected via a chain of Bluetooth communication links. Thus user equipment out of range of each other's Bluetooth transceivers can communicate via a chain of communication links.

For example with reference to FIG. 3, a fifth user equipment terminal 253 is shown (by a dotted box). The fifth user equipment terminal 253 is a candidate on the guest list but is outside of the range of the Bluetooth region 203 of the first user equipment terminal 209. However the fifth user equipment terminal 253 is within the range Bluetooth connection range of the from the second user equipment terminal 211. This is shown in FIG. 3 by the dotted region 251.

In such an embodiment of the invention the second user equipment 211, having accepted the invite from the first user equipment 209 via the Bluetooth communications link 221 performs a scan to detect any further candidates. During its scan it detects the fifth user equipment terminal 253 via the Bluetooth communication link 255. The fifth user equipment 253 accepts and performs its own scan of its local area to detect any other candidates. The fifth user equipment 253 is unable to detect either the third 213 or fourth 215 user equipment and so reports back to the second user equipment 211, which reports back to the first user equipment terminal 209. Thus the requirement for an additional cellular link is removed.

In all of the embodiments of the invention the advantages can be clearly seen in that wherever possible the faster local communication system such as Bluetooth is used to pass the network application data, the number of cellular telecommunications links being kept to a minimum. Furthermore in keeping the cellular telecommunications links to a minimum the cost of using the network application is reduced. In the example shown in FIG. 3 four (or five) separate users only require a single cellular telecommunications link in order to complete the network application communications net.

The invention claimed is:

1. An apparatus, comprising:
a first transceiver configured to transmit to and receive from at least one further apparatus directly;
a second transceiver configured to transmit to and receive from at least one further apparatus via a cellular telecommunications network;
a memory, said memory comprising a list identifying at least one further apparatus;
a scanner configured to determine whether the listed at least one further apparatus is contactable via the first transceiver;
a determining unit configured to determine if the listed at least one further communications terminal is configured to communicate using the first transceiver with at least one other communications terminal for which said second transceiver has been selected; and
a selector configured to select the first or second transceiver in order to communicate with the listed at least one further apparatus, wherein the selector is configured to select the first or second transceiver in dependence on the scanner determining whether the listed at least one further apparatus is directly contactable via said first transceiver and configured to select the first transceiver configured to communicate directly to the listed at least one further communications terminal if the listed at least one further communications terminal is contactable via said first transceiver.

2. An apparatus as claimed in claim 1, wherein said list comprises at least one of:
telephone numbers;
user identifiers;
user nicknames; and
bluetooth addresses.

3. An apparatus as claimed in claim 1, wherein said list further comprises detection information, said detection information identifying whether said at least one apparatus identified in said list is contactable.

4. An apparatus as claimed in claim 1, wherein said list further comprises acceptance information, said acceptance information identifying whether said apparatus identified in said list has accepted an invite to communicate.

5. An apparatus as claimed in claim 1, wherein said list further comprises network information, said network information identifying whether said apparatus identified in said list is contactable by said first or said second transceiver and from which other apparatus said apparatus is contactable from.

6. An apparatus as claimed in claim 1, wherein said selector further comprises a copying unit configured to copy and an updating unit configured to pass copies of said list to each of said apparatus on the list.

7. An apparatus as claimed in claim 1, wherein said apparatus is at least one of:
a personal communications device;
a personal digital assistant;
a personal computer.

8. An apparatus as claimed in claim 1, wherein said first transceiver comprises first wireless transceiver.

9. An apparatus as claimed in claim 8, wherein said first wireless is at least one of:
a Bluetooth transceiver;
a infrared data association transceiver; and
a 802.11 transceiver.

10. An apparatus as claimed in claim 1, wherein said second transceiver comprises wireless cellular transceiver.

11. An apparatus as claimed in claim 10, wherein said wireless cellular transceiver is at least one of:
a global positioning system transceiver;
a universal mobile telecommunications system transceiver;
a wideband code division multiple access transceiver; and
a code division multiple access 2000 transceiver.

12. An apparatus as claimed in claim 1, wherein the area of coverage of said first transceiver is less than the area of coverage of said second transceiver.

13. A method, comprising:
choosing a list, the list comprising a list of identification values which can be used to contact a user operating at least one further communication terminal;
detecting if any further communication terminal is directly contactable via a first transceiver;
identifying if the listed at least one communications terminal is detected;
determining if the listed at least one further communications terminal is configured to communicate using the first transceiver with at least one other communications terminal for which said second transceiver has been selected;
selecting either a first transceiver for communicating directly to the listed at least one further communications terminal, or a second transceiver for communicating to the listed at least one further communications terminal via a communications network in dependence on the result of said identifying of detection; and
selecting the first transceiver configured to communicate directly to the listed at least one further communications terminal if the listed at least one further communications terminal is contactable via said first transceiver.

14. A method as claimed in claim 13 wherein said identifying of detection comprises at least one of:
identifying the listed at least one further communication terminal by a telephone number stored in the list;
identifying the listed at least one further communication terminal by a user identifier stored in the list;
identifying the listed at least one further communication terminal by a bluetooth address stored in the list; and
identifying the listed at least one further communication terminal by a user nickname stored in the list.

15. A method as claimed in claim 13, wherein said identifying of detection further comprises
storing detection information in the list, the detection information identifying whether the listed at least one further communication terminal identified in the list is contactable.

16. A method as claimed in claim 13, wherein the identifying of detection further comprises
storing acceptance information in the list, the acceptance information identifying whether the identified communication terminal has accepted an invite to communicate.

17. A method as claimed in claim 13, wherein the identifying of detection further comprises
storing network information in the list, the network information identifying whether the identified communication terminal is to be contacted by the first or the second transceiver and from which other identified communication terminal the communication terminal is contactable from.

18. A method as claimed in claim 13, wherein the identifying of detection further comprises
copying the list to each of the identified communication terminals.

19. A method as claimed in claim 13, wherein the communication terminal is at least one of:
a personal communications device;
a personal digital assistant; and
a personal computer.

20. A method as claimed in claim 13, wherein the first transceiver is at least one of:
a Bluetooth transceiver;
a infrared data association transceiver; and
a 802.11 transceiver.

21. A method as claimed in claim 13, wherein the second transceiver is a wireless cellular transceiver is at least one of:
a global positioning system transceiver;
a universal mobile telecommunications system transceiver;
a wideband code division multiple access transceiver; and
a code division multiple access 2000 transceiver.

22. A method as claimed in claim 13, wherein the area of coverage of the first transceiver is less than the area of coverage of the second transceiver.

23. A method as claimed in claim 13, wherein the selecting of the first transceiver further comprises
selecting the first transceiver if the listed at least one further communication terminal is contactable by the first transceiver.

24. A method as claimed in claim 13, further comprising:
detecting whether a further listed at least one further communication terminal is contactable using a first transceiver from at least one detected communications terminal; and
selecting the first transceiver of the at least one detected communication terminal if the further listed at least one further communication terminal is contactable by the first transceiver from the detected communication terminal.

25. A method as claimed in claim 13, further comprising:
    determining if the listed at least one further communication terminal is configured to communicate using the first transceiver; and
    selecting the second transceiver configured to communicate to the listed at least one further communication terminal via the telecommunications network if the listed at least one further communications terminal is not contactable via said first transceiver.

26. An apparatus, comprising:
    first transceiver means for transmitting to and receiving from at least one further apparatus directly;
    second transceiver means for transmitting to and receiving from at least one further apparatus via a cellular telecommunications network;
    memory means for storing a list identifying at least one further apparatus;
    scanning means for determining whether the listed at least one further apparatus is contactable via the first transceiver means;
    determining means for determining if the listed at least one further communications terminal is configured to communicate using the first transceiver means with at least one other communications terminal for which said second transceiver means has been selected; and
    selecting means for selecting the first or second transceiver means in order to communicate with the listed at least one further apparatus, wherein the selecting means selects the first or second transceiver means in dependence on the scanning means determining whether the listed at least one further apparatus is contactable via said first transceiver means, and for selecting the first transceiver configured to communicate directly to the listed at least one further communications terminal if the listed at least one further communications terminal is contactable via said first transceiver means.

* * * * *